US012759253B2

(12) United States Patent
Högblom

(10) Patent No.: US 12,759,253 B2
(45) Date of Patent: Oct. 13, 2026

(54) METHOD FOR TRANSPORTING A CELLULOSE BLANK STRUCTURE VIA A BUFFERING MODULE AND BUFFERING MODULE

(71) Applicant: PULPAC AB, Västra Frölunda (SE)

(72) Inventor: Olle Högblom, Gothenburg (SE)

(73) Assignee: PULPAC AB, Västra Frölunda (SE)

( * ) Notice: Subject to any disclaimer, the term of this patent is extended or adjusted under 35 U.S.C. 154(b) by 0 days.

(21) Appl. No.: 18/881,780

(22) PCT Filed: Jun. 7, 2023

(86) PCT No.: PCT/EP2023/065270
§ 371 (c)(1),
(2) Date: Jan. 7, 2025

(87) PCT Pub. No.: WO2024/008383
PCT Pub. Date: Jan. 11, 2024

(65) Prior Publication Data

US 2026/0001295 A1 Jan. 1, 2026

(30) Foreign Application Priority Data

Jul. 8, 2022 (SE) .................................... 2250875-8

(51) Int. Cl.
*B31B 50/04* (2017.01)
*B31B 50/00* (2017.01)
(Continued)

(52) U.S. Cl.
CPC .......... *B31B 50/042* (2017.08); *B31B 50/006* (2017.08); *B31B 50/30* (2017.08);
(Continued)

(58) Field of Classification Search
CPC ................ B31B 50/042; B31B 50/741; B31B 2120/00; B65H 5/34; B65H 2301/44316;
(Continued)

(56) References Cited

U.S. PATENT DOCUMENTS 5,271,790 A * 12/1993 Nojiri ................ B29D 30/3007 156/405.1
6,215,205 B1 * 4/2001 Banas .................... B65H 20/32 310/12.32
(Continued)

FOREIGN PATENT DOCUMENTS

DE 2529129 A1 1/1977
EP 0543052 A1 5/1993
(Continued)

OTHER PUBLICATIONS

International Search Report and Written Opinion mailed Aug. 29, 2023 for International Application No. PCT/EP2023/065270, 13 pages.

*Primary Examiner* — Andrew M Tecco
*Assistant Examiner* — Nicholas E Igbokwe
(74) *Attorney, Agent, or Firm* — Sage Patent Group

(57) ABSTRACT

A method for transporting an air-formed cellulose blank structure to a forming mould via a buffering module. The method includes the steps: continuously feeding the cellulose blank structure on a first endless belt unit in a first feeding direction, and redirecting the cellulose blank structure to a second endless belt unit; feeding the cellulose blank structure on the second endless belt unit in a second feeding direction being at least partly opposite the first feeding direction, where the second endless belt unit alternatingly is longitudinally moved in opposite directions relative to the first endless belt unit and a third endless belt unit, and redirecting the cellulose blank structure to the third endless belt unit; intermittently feeding the cellulose blank structure
(Continued)

on the third endless belt unit in a third feeding direction at least partly coinciding with the first feeding direction.

17 Claims, 8 Drawing Sheets

(51) Int. Cl.

| | |
|---|---|
| ***B31B 50/30*** | (2017.01) |
| ***B31B 50/74*** | (2017.01) |
| ***B31B 100/00*** | (2017.01) |
| ***B31B 120/00*** | (2017.01) |
| ***B65H 5/02*** | (2006.01) |
| ***B65H 5/34*** | (2006.01) |
| ***D21J 3/10*** | (2006.01) |

(52) U.S. Cl.
CPC ........... *B31B 50/741* (2017.08); *B65H 5/023* (2013.01); *B65H 5/34* (2013.01); *D21J 3/10* (2013.01); *B31B 2100/00* (2017.08); *B31B 2120/00* (2017.08); *B65H 2301/44316* (2013.01); *B65H 2701/1944* (2013.01); *B65H 2801/84* (2013.01)

(58) Field of Classification Search
CPC ........ B65H 2701/1944; B65G 47/5131; B65G 47/46
See application file for complete search history.

(56) References Cited

U.S. PATENT DOCUMENTS

| | | | | | |
|---|---|---|---|---|---|
| 6,688,508 | B2 * | 2/2004 | Ishiwatari | B29C 48/08 | 226/170 |
| 7,108,125 | B2 * | 9/2006 | Gilmore | A61L 31/16 | 198/313 |
| 8,612,050 | B2 * | 12/2013 | Lee | B65G 47/31 | 700/226 |
| 2016/0083196 | A1 * | 3/2016 | Dugat | B65G 21/12 | 198/370.1 |
| 2019/0070819 | A1 * | 3/2019 | Larsson | B29C 51/30 | |
| 2021/0010167 | A1 * | 1/2021 | Roess | A01F 29/005 | |
| 2023/0286018 | A1 * | 9/2023 | Bover Capdevila | B07C 5/36 | |

FOREIGN PATENT DOCUMENTS

| | | | |
|---|---|---|---|
| EP | 0918717 | A1 | 6/1999 |
| WO | 2021148514 | A1 | 7/2021 |
| WO | 2022238484 | A1 | 11/2022 |

* cited by examiner

METHOD FOR TRANSPORTING A CELLULOSE BLANK STRUCTURE VIA A BUFFERING MODULE AND BUFFERING MODULE

CROSS-REFERENCE TO RELATED APPLICATIONS

This application is a 35 U.S.C. § 371 national stage application for International Application No. PCT/EP2023/065270, entitled "METHOD FOR TRANSPORTING A CELLULOSE BLANK STRUCTURE VIA A BUFFERING MODULE AND BUFFERING MODULE", filed on Jun. 7, 2023, which claims priority to Swedish Patent Application No. 2250875-8, filed on Jul. 8, 2022, the disclosures and contents of which are hereby incorporated by reference in their entireties.

TECHNICAL FIELD

The present disclosure relates to a method for transporting an air-formed cellulose blank structure to a forming mould via a buffering module. The disclosure further relates to a buffering module for buffering the cellulose blank structure.

BACKGROUND

Cellulose fibres are commonly used as raw material for producing or manufacturing cellulose products. Products formed of cellulose fibres can be used in many different situations where there is a need for sustainable products. A wide range of cellulose products can be produced from cellulose fibres and a few examples are disposable plates and cups, cutlery, lids, bottle caps, coffee pods, blank structures, hangers, and packaging materials.

Forming mould systems are commonly used when manufacturing cellulose products from raw materials including cellulose fibres, and traditionally the cellulose products have been produced by wet-forming methods. A material commonly used for wet-forming cellulose fibre products is wet moulded pulp. Wet-formed products are generally formed by immersing a suction forming mould into a liquid or semi liquid pulp suspension or slurry comprising cellulose fibres, and when suction is applied, a body of pulp is formed with the shape of the desired product by fibre deposition onto the forming mould. With all wet-forming methods, there is a need for drying of the wet moulded product, where the drying process is a time and energy consuming part of the production. The demands on aesthetical, chemical and mechanical properties of cellulose products are increasing, and due to the properties of wet-formed cellulose products, the mechanical strength, flexibility, freedom in material thickness, and chemical properties are limited. It is also difficult in wet-forming processes to control the mechanical properties of the products with high precision.

One development in the field of producing cellulose products is dry-forming of cellulose products without using wet-forming methods. Instead of forming the cellulose products from a liquid or semi liquid pulp suspension or slurry, an air-formed cellulose blank structure is used. The air-formed cellulose blank structure is inserted into a forming mould and during the dry-forming of the cellulose products, the cellulose blank is subjected to a high forming pressure and a high forming temperature. One difficulty with dry-forming methods is the problem with intermittently feeding the cellulose blank structure to the forming mould, due to intermittent operation of the forming mould when dry-forming the cellulose products. Traditionally, complex and non-efficient feeding units are used for the intermittent feeding of the cellulose blank structure to the forming mould and there is a risk for breaking the cellulose blank structure during the intermittent feeding operation. There is thus a need for more efficient and careful intermittent feeding systems.

SUMMARY

An object of the present disclosure is to provide a method for transporting an air-formed cellulose blank structure to a forming mould via a buffering module, and a buffering module, where the previously mentioned problems are avoided. This object is at least partly achieved by the features of the independent claims. The dependent claims contain further developments of the method and the buffering module.

The disclosure concerns a method for transporting an air-formed cellulose blank structure to a forming mould via a buffering module, where the cellulose blank structure has a first side and an opposite second side. The forming mould is arranged for dry-forming cellulose products from the cellulose blank structure. The buffering module comprises a first endless belt unit, a second endless belt unit, and a third endless belt unit, where the second endless belt unit is arranged in-between and in a longitudinal overlapping relationship to the first endless belt unit and the third endless belt unit. The second endless belt unit is movably arranged relative to the first endless belt unit and the third endless belt unit. The method comprises the steps: continuously feeding the cellulose blank structure on the first endless belt unit in a first feeding direction, and redirecting the cellulose blank structure to the second endless belt unit; feeding the cellulose blank structure on the second endless belt unit in a second feeding direction being at least partly opposite the first feeding direction, where the second endless belt unit alternatingly is longitudinally moved in opposite directions relative to the first endless belt unit and the third endless belt unit, and redirecting the cellulose blank structure to the third endless belt unit; intermittently feeding the cellulose blank structure on the third endless belt unit in a third feeding direction at least partly coinciding with the first feeding direction.

Advantages with these features are that the endless belt units efficiently establish the intermittent feeding of the cellulose blank structure. The cellulose blank structure is continuously fed to the buffering module, and intermittently fed from the buffering module, and the buffering module is securing an efficient transportation of the cellulose blank structure to the intermittently operating forming mould. The endless belt units are supporting the cellulose blank structure during the transportation through the buffering module and this is minimizing the risk of breakage.

In one embodiment, the buffering module is configured for alternatingly operating in a buffering mode and a feeding mode. The method further comprises the steps: operating the first endless belt unit with a continuous input transportation speed in the buffering mode and the feeding mode; operating the third endless belt unit with a first transportation speed upon longitudinal movement of the second endless belt unit in a first direction in the buffering mode; and operating the third endless belt unit with a second transportation speed upon longitudinal movement of the second endless belt unit in a second direction opposite the first direction in the feeding mode. The operation of the buffering module in the buffering mode and the feeding mode, with the first and second transportation speeds of the third endless belt unit, is efficiently enabling the intermittent feeding of the cellulose blank structure from the buffering module to the forming mould.

In one embodiment, the buffering module comprises an inlet portion, an outlet portion, and a buffering portion between the inlet portion and the outlet portion. The cellulose blank structure has a buffering extension in the buffering portion between the inlet portion and the outlet portion. The method further comprises the steps: gradually increasing the buffering extension of the cellulose blank structure in the buffering portion during the buffering mode, and gradually decreasing the buffering extension of the cellulose blank structure in the buffering portion during the feeding mode. This operation of the buffering module is enabling a smooth buffering of the cellulose blank structure as well as a smooth release of the cellulose blank structure from the buffering module.

In one embodiment, the first direction is a direction away from the forming mould and the second direction is a direction towards the forming mould. The first transportation speed is lower than the second transportation speed. The lower first transportation speed is enabling the intermittent feeding of the cellulose blank structure from the buffering module to the forming mould.

In one embodiment, the first transportation speed is zero, or the first transportation speed is essentially zero. The zero transportation speed, or essentially zero transportation speed, is enabling a non-moving cellulose blank structure during forming of the cellulose blank structure in the forming mould.

In one embodiment, the method further comprises the steps: forming the cellulose products in the forming mould during the buffering mode when the third endless belt unit is operated with the first transportation speed upon longitudinal movement of the second endless belt unit in the first direction. In the buffering mode, the cellulose blank structure exiting the buffering module may be arranged in a non-moving or essentially non-moving state for facilitating forming of the cellulose products in the forming mould. A non-moving, or essentially non-moving cellulose blank structure in the forming mould during the product forming operation is desired for producing cellulose products with high quality in intermittent pressing operations.

In one embodiment, the method further comprises the steps: feeding the cellulose blank structure into the forming mould during the feeding mode when the third endless belt unit is operated with the second transportation speed upon longitudinal movement of the second endless belt unit in the second direction. The feeding mode is enabling efficient transportation of the cellulose blank structure away from the buffering module to the forming mould.

In one embodiment, a first layer application unit is arranged in connection to the first endless belt unit. The method further comprises the steps: applying one or more first material layers to the cellulose blank structure upon feeding of the cellulose blank structure on the first endless belt unit. The one or more first material layers may be additional layers comprising cellulose fibres. The one or more first material layers may for example be arranged as carrying layers for one or more other layers of the cellulose blank structure, and act as reinforcement layers having a higher tensile strength than other layers of the cellulose blank structure. The one or more first material layers may be of a different composition than the rest of the cellulose blank structure, such as for example a tissue layer containing cellulose fibres, an airlaid structure comprising cellulose fibres, or other suitable layer structures. Other suitable additional layers may also be used such as for example silicone coated structures, bio-based films, or other film structures.

In one embodiment, the method further comprises the steps: applying the one or more first material layers to the first side of the cellulose blank structure.

In one embodiment, the method further comprises the steps: applying the one or more first material layers to the cellulose blank structure in connection to a first downstream end of the first endless belt unit. This is a suitable position for applying the one or more first material layers to the cellulose blank structure for an efficient application process.

In one embodiment, a second layer application unit is arranged in connection to the second endless belt unit. The method further comprises the steps: applying one or more second material layers to the cellulose blank structure upon feeding of the cellulose blank structure on the second endless belt unit. The one or more second material layers may be additional layers comprising cellulose fibres. The one or more second material layers may for example be arranged as carrying layers for one or more other layers of the cellulose blank structure, and act as reinforcement layers having a higher tensile strength than other layers of the cellulose blank structure. The one or more second material layers may be of a different composition than the rest of the cellulose blank structure, such as for example a tissue layer containing cellulose fibres, an airlaid structure comprising cellulose fibres, or other suitable layer structures. Other suitable additional layers may also be used such as for example silicone coated structures, bio-based films, or other film structures.

In one embodiment, the method further comprises the steps: applying the one or more second material layers to the second side of the cellulose blank structure.

In one embodiment, the method further comprises the steps: applying the one or more second material layers to the cellulose blank structure in connection to a second downstream end of the second endless belt unit. This is a suitable position for applying the one or more second material layers to the cellulose blank structure for an efficient application process.

In one embodiment, a first set of spray nozzles is arranged in connection to the first endless belt unit. The method further comprises the steps: applying one or more substances to the first side of the cellulose blank structure upon feeding of the cellulose blank structure on the first endless belt unit. The substances applied by the first set of spray nozzles to the first side of the cellulose blank structure could have any suitable composition for altering the properties of the cellulose blank structure and/or the cellulose products, such as additives or barrier compositions. The substances may be sprayed onto the first side of the cellulose blank structure in liquid or solid form.

In one embodiment, a second set of spray nozzles is arranged in connection to the second endless belt unit. The method further comprises the steps: applying one or more substances to the second side of the cellulose blank structure upon feeding of the cellulose blank structure on the second endless belt unit. The substances applied by the second set of spray nozzles to the second side of the cellulose blank structure could have any suitable composition for altering the properties of the cellulose blank structure and/or the cellulose products, such as additives or barrier compositions. The substances may be sprayed onto the second side of the cellulose blank structure in liquid or solid form.

In some example embodiments, the second set of spray nozzles is arranged to provide a downwards oriented spray direction when applying said one or more substances to the second side of the cellulose blank structure. Downwards spraying has many advantage compared with upwards spraying, such as improved spray pattern and less clogging.

In some example embodiments, the second set of spray nozzles is located between the first endless belt unit and the second endless belt unit. This location enables a downwards oriented spray direction of the second side of the cellulose blank structure.

In some example embodiments, the first endless belt unit is configured to follow a feed path when moving the first feeding direction, and wherein the first endless belt unit is configured to follow a return path when moving in the second feeding direction, wherein the buffering module comprises an additional guide belt roller in the return path of the first endless belt unit for guiding the first endless belt unit and for creating an increased space between the return path of the first endless belt unit and a feed path of the second endless belt unit. Thereby, a second set of spray nozzles may be located in said increased space.

In some example embodiments, the second set of spray nozzles is located in a region between the additional guide belt roller and a first upstream belt roller, as seen in a longitudinal direction of the buffering module. Thereby, a second set of spray nozzles may be located in said increased space.

In one embodiment, the method further comprises the steps: forming the cellulose products from the cellulose blank structure in the forming moulds by heating the cellulose blank structure to a forming temperature in the range of 100-300° C., preferably 100-200° C., and pressing the cellulose blank structure with a forming pressure in the range of 1-100 MPa, preferably 4-20 MPa. These parameters are used for an efficient forming of the cellulose products.

The disclosure further concerns a buffering module for buffering an air-formed cellulose blank structure. The buffering module is arranged in connection to a forming mould configured for dry-forming cellulose products from the cellulose blank structure. The buffering module comprises a first endless belt unit, a second endless belt unit, and a third endless belt unit, where the second endless belt unit is arranged in-between and in a longitudinal overlapping relationship to the first endless belt unit and the third endless belt unit. The second endless belt unit is movably arranged relative to the first endless belt unit and the third endless belt unit. The buffering module is configured for continuously feeding the cellulose blank structure on the first endless belt unit in a first feeding direction, and redirecting the cellulose blank structure to the second endless belt unit. The buffering module is configured for feeding the cellulose blank structure on the second endless belt unit in a second feeding direction being at least partly opposite the first feeding direction, where the second endless belt unit alternatingly is longitudinally moved in opposite directions relative to the first endless belt unit and the third endless belt unit, and redirecting the cellulose blank structure to the third endless belt unit. The buffering module is configured for intermittently feeding the cellulose blank structure on the third endless belt unit in a third feeding direction at least partly coinciding with the first feeding direction.

The endless belt units are efficiently establishing the intermittent feeding of the cellulose blank structure. The cellulose blank structure is continuously fed to the buffering module, and intermittently fed from the buffering module, and the buffering module is securing an efficient transportation of the cellulose blank structure to the forming mould. The endless belt units are efficiently supporting the cellulose blank structure during the transportation through the buffering module, minimizing the risk of breakage.

In one embodiment, the buffering module comprises a first layer application unit arranged in connection to the first endless belt unit. The first layer application unit is configured for applying one or more first material layers to the cellulose blank structure. The first layer application unit is efficiently applying the one or more first material layers to one side of the cellulose blank structure.

In one embodiment, the first layer application unit is arranged in connection to a first downstream end of the first endless belt unit. This position is used for an efficient application of the one or more first material layers to the cellulose blank structure.

In one embodiment, the buffering module comprises a second layer application unit arranged in connection to the second endless belt unit. The second layer application unit is configured for applying one or more second material layers to the cellulose blank structure. The second layer application unit is efficiently applying the one or more second material layers to the other side of the cellulose blank structure.

In one embodiment, the second layer application unit is arranged in connection to a second downstream end of the second endless belt unit. This position is used for an efficient application of the one or more second material layers to the cellulose blank structure. The one or more second material layers are suitably applied a predetermined distance from the turning point of the second endless belt unit.

In one embodiment, the buffering module comprises a first set of spray nozzles arranged in connection to the first endless belt unit. The first set of spray nozzles is configured for applying one or more substances to the cellulose blank structure. The substances applied by the first set of spray nozzles to the cellulose blank structure could have any suitable composition for altering the properties of the cellulose blank structure and/or the cellulose products, such as additives or barrier compositions. The substances may be sprayed onto the cellulose blank structure in liquid or solid form.

In one embodiment, the buffering module comprises a second set of spray nozzles arranged in connection to the second endless belt unit. The second set of spray nozzles is configured for applying one or more substances to the cellulose blank structure. The substances applied by the second set of spray nozzles to the cellulose blank structure could have any suitable composition for altering the properties of the cellulose blank structure and/or the cellulose products, such as additives or barrier compositions. The substances may be sprayed onto the cellulose blank structure in liquid or solid form.

BRIEF DESCRIPTION OF DRAWINGS

The disclosure will be described in detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
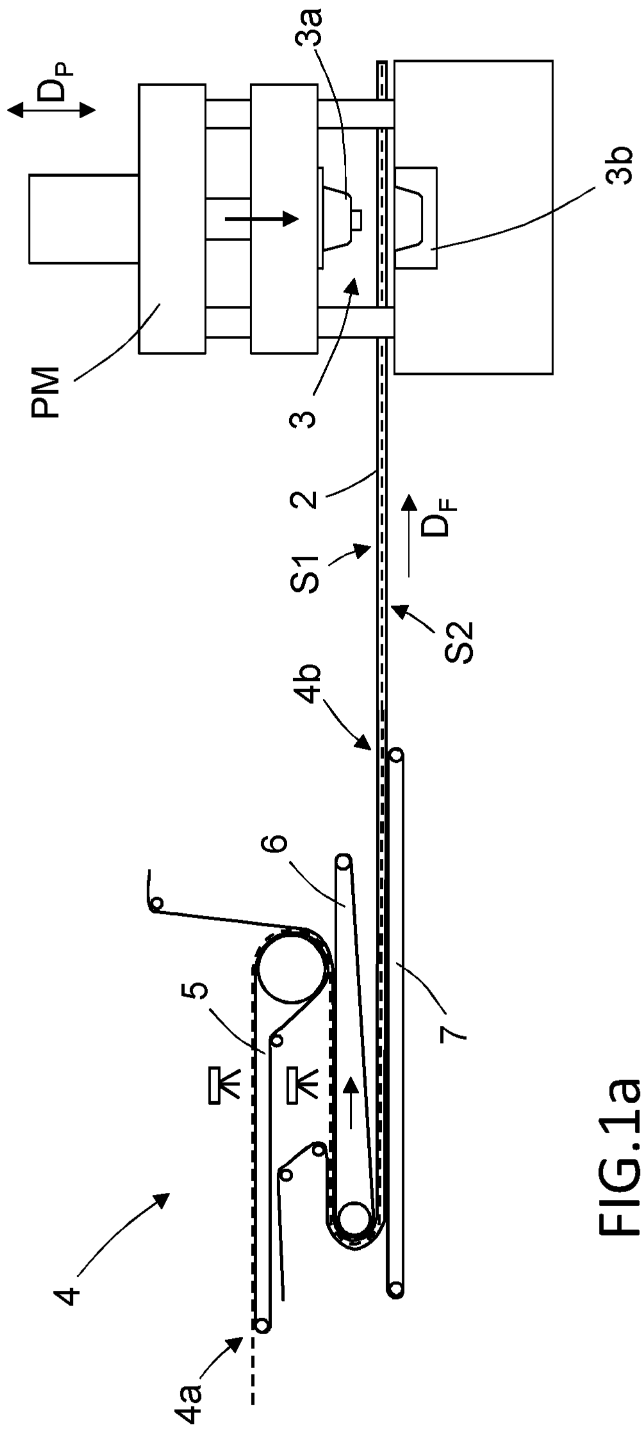
FIG. 1*a-c* show schematically, in side views, a buffering module arranged in connection to a forming mould according to an embodiment.
Figure 1B:
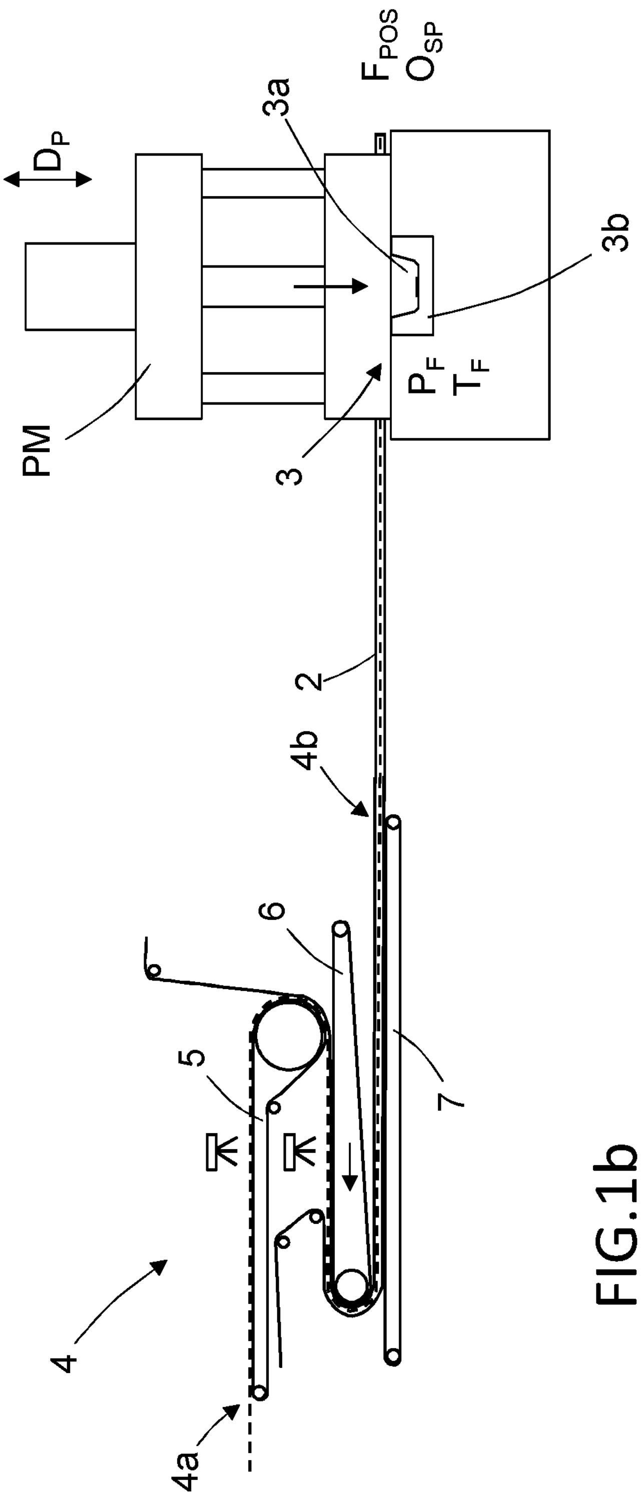
Figure 1C:
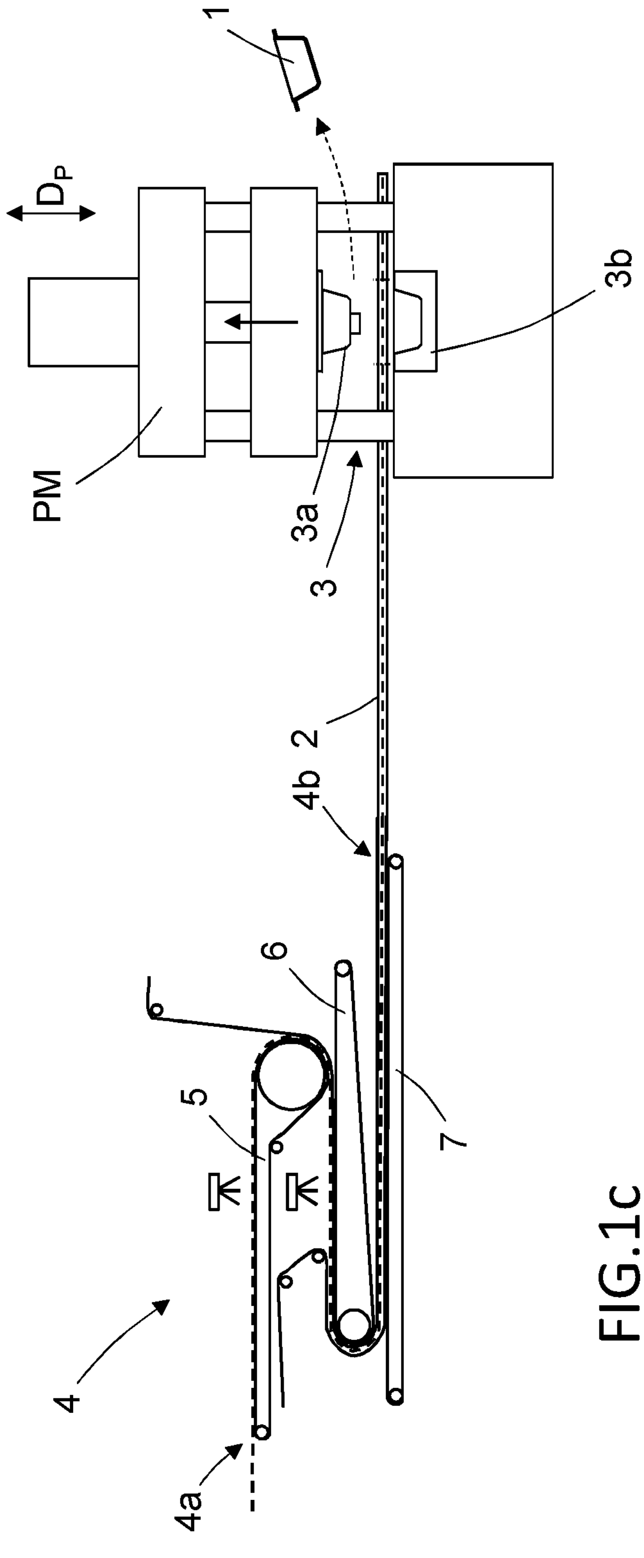

FIGS. 1*a-c* schematically show a pressing module PM for dry-forming cellulose products 1 from an air-formed cellulose blank structure 2, and a buffering module 4 arranged in connection to the pressing module PM. The pressing module PM comprises a forming mould 3, and the forming mould 3 is configured for dry-forming the cellulose products 1 from the cellulose blank structure 2. The cellulose blank structure 2 is transported to the forming mould 3 via the buffering module 4. The forming mould 3 is arranged with a first mould part 3*a* and a second mould part 3*b* configured for interacting with each other for forming the cellulose products 1 from the air-formed cellulose blank structure 2 in the forming mould 3. The first mould part 3*a* and/or the second mould part 3*b* are movably arranged relative to each other in a pressing direction $D_P$, and arranged to be pressed relative to each other during forming of the cellulose products 1. The buffering module 4 is arranged for buffering the cellulose blank structure 2 upon feeding of the cellulose blank structure 2 to the forming mould 3. The cellulose blank structure 2 has a first side S1 and an opposite second side S2.

The cellulose products 1 are dry-formed from the air-formed cellulose blank structure 2 in the pressing module PM. With an air-formed cellulose blank structure 2 is meant an essentially air-formed fibrous web structure produced from cellulose fibres, where the cellulose fibres are carried and formed to the cellulose blank structure 2 by air as carrying medium. The cellulose blank structure 2 comprises loose and separated cellulose fibres that are compressed upon forming of the cellulose products 1. With loose and separated cellulose fibres is meant cellulose fibres that are separated from each other and loosely arranged relative to each other within the cellulose blank structure 2, or cellulose fibres or cellulose fibre bundles that are separated from each other and loosely arranged relative to each other within the cellulose blank structure 2. The cellulose fibres may originate from a suitable cellulose raw material, such as a pulp material. Suitable pulp materials are for example fluff pulp, paper structures, or other cellulose fibre containing structures. The cellulose fibres may also be extracted from agricultural waste materials, for example wheat straws, fruit and vegetable peels, bagasse, or from other suitable sources. When for example using pulp as raw material for the cellulose blank structure 2, the pulp structure commonly needs to be separated in a separating unit, such as a suitable mill unit, before the air-forming of the cellulose blank structure 2. In the separating unit, the pulp structure is separated into individual cellulose fibres, or into individual cellulose fibres and cellulose fibre bundles, and the better milling process the more individual cellulose fibres are formed. In other embodiments, only individual cellulose fibres may be used as raw material for the cellulose blank structure 2. With air-forming of the cellulose blank structure 2 is meant the formation of a cellulose blank structure in a dry and controlled fibre forming process in which the cellulose fibres are air-formed to produce the cellulose blank structure 2. When forming the cellulose blank structure 2 in the air-forming process, the cellulose fibres are carried and formed to the cellulose blank structure 2 by air as carrying medium. It should be understood that even if the cellulose blank structure 2 is slightly compacted before the forming of the cellulose products 1, such as compacting the cellulose blank structure 2 for feeding or transportation purposes, the cellulose blank structure 2 still comprises loose and separated cellulose fibres.

The air-forming process for forming the cellulose blank structure 2 is different from a normal papermaking process or a traditional wet-forming process, where water is used as carrying medium for the cellulose fibres when forming the paper or fibre structure. In the air-forming process, small amounts of water or other substances may if desired be added to the cellulose fibres in order to change the properties of the cellulose products, but air is still used as carrying medium in the forming process. The cellulose blank structure 2 may, if suitable have a dryness that is mainly corresponding to the ambient humidity in the atmosphere surrounding the air-formed cellulose blank structure 2. As an alternative, the dryness of the cellulose blank structure 2 can be controlled in order to have a suitable dryness level when forming the cellulose products 1.

The air-formed cellulose blank structure 2 may be formed of cellulose fibres in a conventional air-forming process or in a cellulose blank air-forming module. The cellulose blank structure 2 may have a composition where the fibres are of the same origin or alternatively contain a mix of two or more types of cellulose fibres. The cellulose fibres used in the cellulose blank structure 2 are during the forming process of the cellulose products 1 bonded to each other with hydrogen bonds, due to applied forming pressure and forming temperature together with adequate moist content in the cellulose blank structure 2. The cellulose fibres may be mixed with other substances to a certain amount as will be further described below. With cellulose fibres is meant any type of cellulose fibres, such as natural cellulose fibres or manufactured cellulose fibres. The cellulose blank structure 2 may specifically comprise at least 95% dry weight cellulose fibres, or more specifically at least 99% dry weight cellulose fibres.

The air-formed cellulose blank structure 2 may have a single-layer or a multi-layer configuration. A cellulose blank structure 2 having a single-layer configuration is referring to a structure that is formed of one layer containing cellulose fibres. A cellulose blank structure 2 having a multi-layer configuration is referring to a structure that is formed of two or more layers comprising cellulose fibres, where the layers may have the same or different compositions or configurations.

The cellulose blank structure 2 may comprise one or more additional layers, where the one or more additional layers may be additional cellulose layers comprising cellulose fibres. The one or more additional layers may for example be arranged as carrying layers for one or more other layers of the cellulose blank structure 2. The one or more additional layers may act as reinforcement layers having a higher tensile strength than other layers of the cellulose blank structure 2. This is useful when one or more air-formed layers of the cellulose blank structure 2 have compositions with low tensile strength in order to avoid that the cellulose blank structure 2 will break during the forming of the cellulose products 1. The one or more additional layers with higher tensile strength act in this way as a supporting structure for other layers of the cellulose blank structure 2.

The one or more additional cellulose layers may be of a different composition than the rest of the cellulose blank structure 2, such as for example a tissue layer containing cellulose fibres, an airlaid structure comprising cellulose fibres, or other suitable layer structures. It is thus not necessary that the one or more additional cellulose layers are air-formed. Other suitable additional layers may also be used such as for example silicone coated structures, bio-based films, or other film structures.

The one or more air-formed layers of the cellulose blank structure 2 are fluffy and airy structures, where the cellulose fibres forming the structures are arranged relatively loosely relative to each other. The fluffy cellulose blank structures 2 are used for an efficient dry-forming of the cellulose products 1, allowing the cellulose fibres to form the cellulose products 1 in an efficient way during the dry-forming process in the pressing module PM.

FIGS. 1*a-c* schematically show an example embodiment of the pressing module PM for dry-forming cellulose products 1 from the cellulose blank structure 2. To form the cellulose products 1 from the air-formed cellulose blank structure 2 in the pressing module PM, the cellulose blank structure 2 is first provided from a suitable source. The cellulose blank structure 2 may be air-formed from cellulose fibres and arranged on rolls or in stacks. The rolls or stacks may thereafter be arranged in connection to the pressing module PM, and the cellulose blank structure 2 is intermittently fed to the pressing module PM via the buffering module 4. As an alternative, the cellulose blank structure 2 may be air-formed from cellulose fibres in a non-illustrated cellulose blank air-forming module arranged in connection to the pressing module PM, and intermittently fed to the pressing module PM after the air-forming operation via the buffering module 4.

The pressing module PM comprises one or more forming moulds 3, and the one or more forming moulds 3 are configured for dry-forming the cellulose products 1 from the cellulose blank structure 2. The pressing module PM may be arranged with only one forming mould 3 in a single-cavity configuration, or alternatively with two or more forming moulds in a multi-cavity configuration. A single-cavity configuration pressing module thus comprises only one forming mould 3 with a first mould part 3*a* and a cooperating second mould part 3*b*. A multi-cavity configuration pressing module comprises two or more forming moulds 3, each having cooperating first mould part 3*a* and second mould part 3*b*.

In the embodiment illustrated in FIGS. 1*a-c*, the pressing module PM is arranged as a single-cavity configuration pressing module comprising one forming mould 3 with a first mould part 3*a* and a second mould part 3*b* movably arranged relative to each other. In the following, the pressing module PM will be described in connection to a single-cavity configuration pressing module, but the disclosure is equally applicable on a multi-cavity configuration pressing module.

The pressing module PM can for example be constructed so that the first mould part 3*a* or the second mould part 3*b* is movable and arranged to move towards the other mould part during the dry-forming process, where the other mould part is stationary or non-movably arranged. In the embodiment illustrated in FIGS. 1*a-c*, the first mould part 3*a* is movably arranged and the second mould part 3*b* is stationary. In an alternative non-illustrated embodiment, both the first mould part 3*a* and the second mould part 3*b* are movably arranged, where the first mould part 3*a* and the second mould part 3*b* are displaced in directions towards each other during the dry-forming process. The moving mould parts may be displaced with a suitable actuator, such as a hydraulic, pneumatic, or electric actuator. A combination of different actuators may also be used. The relative speed between the first mould part 3*a* and the second mould part 3*b* during the dry-forming process is suitably chosen so that the cellulose blank structure 2 is evenly distributed in the forming mould 3 during the dry-forming process.

As indicated in FIGS. 1*a-c*, the first mould part 3*a* is movably arranged relative to the second mould part 3*b* in the pressing direction $D_P$ and the first mould part 3*a* is further arranged to be pressed towards the second mould part 3*b* in the pressing direction $D_P$ during dry-forming of the cellulose products 1 for establishing a forming pressure $P_F$ onto the cellulose blank structure 2. When dry-forming the cellulose products 1, the cellulose blank structure 2 is arranged between the first mould part 3*a* and the second mould part 3*b* when the forming mould 3 is in an open state, as shown in FIG. 1*a*. When the cellulose blank structure 2 has been arranged in the forming mould 3, the first mould part 3*a* is moved towards the second mould part 3*b* during the dry-forming process. When the forming pressure $P_F$ together with a suitable forming temperature $T_F$ are established in the forming mould 3 onto the cellulose blank structure 2, the movement of the first mould part 3*a* is stopped in a product forming position $F_{POS}$, as shown in FIG. 1*b*. As shown in FIG. 1*c*, the first mould part 3*a* is thereafter moved in a direction away from the second mould part 3*b* after a certain time duration or directly after the first mould part 3*a* has been stopped. A suitable control system may be used for controlling the operation of the pressing module $P_M$ and the forming mould 3.

The cellulose products 1 are dry-formed from the cellulose blank structure 2 in the forming mould 3 by applying the forming pressure $P_F$ and the forming temperature $T_F$ onto the air-formed cellulose blank structure 2. The cellulose blank structure 2 is heated to a forming temperature $T_F$ in the range of 100-300° C., preferably in the range of 100-200° C., and pressed with a forming pressure $P_F$ in the range of 1-100 MPa, preferably in the range of 4-20 MPa. The first mould part 3*a* is arranged for forming the cellulose products 1 through interaction with the corresponding second mould part 3*b*. During dry-forming of the cellulose products 1, the air-formed cellulose blank structure 2 is arranged in the forming mould 3, between the first mould part 3*a* and the second mould part 3*b*, and exerted to the forming pressure $P_F$ in the range of 1-100 MPa, preferably in the range of 4-20 MPa, and the forming temperature $T_F$ in the range of 100-300° C., preferably in the range of 100-200° C. When dry-forming the cellulose products 1, hydrogen bonds are formed between the cellulose fibres in the cellulose blank structure 2 arranged between the first mould part 3*a* and the second mould part 3*b*, due to the applied forming pressure $P_F$ and forming temperature $T_F$ together with adequate moist content in the cellulose blank structure 2.

The temperature and pressure levels are for example measured in the cellulose blank structure 2 during the dry-forming process with suitable sensors arranged in or in connection to the cellulose fibres in the cellulose blank structure 2. The cellulose blank structure 2 is typically containing less than 45 weight percent water when formed in the forming mould 3.

A cellulose product forming cycle is schematically illustrated in FIGS. 1*a-c*. The cellulose blank structure 2 is, as indicated in FIG. 1*a*, transported to the forming mould 3 in a feeding direction $D_F$ with a suitable transportation speed. The cellulose blank structure 2 is fed intermittently to the forming mould 3 through operation of the buffering module 4, as will be further described below. In order to form the cellulose products 1, the cellulose blank structure 2 is arranged between the first mould part 3a and the second mould part 3b, as shown in FIG. 1a. Upon forming of the cellulose products 1, the first mould part 3a is moved towards the second mould part 3b. When the first mould part 3a is moved towards the second mould part 3b with the cellulose blank structure 2 positioned between the mould parts, the forming pressure $P_F$ is established onto the cellulose blank structure 2 by the force applied by the first mould part 3a. The interaction between the first mould part 3a and the second mould part 3b is in the forming position $F_{POS}$ thus establishing the forming pressure $P_F$ in the forming mould 3. The applied force is during the forming process establishing the forming pressure $P_F$ onto the cellulose blank structure 2, as shown in FIG. 1b, which together with the forming temperature $T_F$ applied onto the cellulose blank structure 2 are dry-forming the cellulose products 1.

Suitably, the forming pressure $P_F$ is applied onto the air-formed cellulose blank structure 2 during a single pressing operation $O_{SP}$ upon forming of the cellulose products 1 in the forming mould 3. With a single pressing operation $O_{SP}$ is meant that the cellulose products 1 are formed from the cellulose blank structure 2 in one single pressing step in the forming mould 3. In the single pressing operation $O_{SP}$, the first mould part 3a and the second mould part 3b are interacting with each other for establishing the forming pressure $P_F$ and the forming temperature $T_F$ during a single operational engagement step. Thus, in the single pressing operation $O_{SP}$, the forming pressure $P_F$ and the forming temperature $T_F$ are not applied to the cellulose blank structure 2 in two or more repeated pressing steps.

When the cellulose products have been dry-formed in the forming mould 3, the first mould part 3a is moved away from the second mould part 3b, as shown in FIG. 1c, and the formed cellulose products 1 can be removed from the forming mould 3. After removal of the cellulose products 1, the cellulose product forming cycle is repeated. The forming mould is thus operated intermittently in repeated cellulose product forming cycles.

For all embodiments, the forming mould may be arranged with stiff mould parts or alternatively with one or more deformation elements arranged in the mould parts. With stiff mould parts is meant that the mould parts are made of a stiff material with limited deformation capabilities, such as for example steel or aluminium. A deformation element is made of a material that is allowed to deform when forming the cellulose products 1 in the forming mould 3.

If the forming mould 3 comprises a deformation element, the deformation element is made of a material that can be deformed when a force or pressure is applied, and the deformation element is suitably made of an elastic material capable of recovering size and shape after deformation. If the deformation element is made of such a material, an even pressure distribution can be achieved in the forming process, where the pressure exerted onto the cellulose blank structure 2 from the deformation element is equal or essentially equal in all directions. When the deformation element under pressure is in a fluid-like state, a uniform fluid-like pressure distribution is achieved. The forming pressure $P_F$ is with such a material thus applied to the cellulose blank structure 2 from all directions, and the deformation element may exert an isostatic forming pressure, or close to an isostatic forming pressure, on the cellulose blank structure during the dry-forming of the cellulose products.

The buffering module 4 will be described more in detail in connection to FIGS. 2a-c and 3a-c. In the illustrated embodiment, the buffering module 4 comprises a first endless belt unit 5, a second endless belt unit 6, and a third endless belt unit 7. The buffering module 4 has an extension in a longitudinal direction $D_{LO}$, a width direction $D_W$ and a height direction $D_H$ as understood from the figures. The longitudinal direction $D_{LO}$ is corresponding to, or essentially corresponding to, a first feeding direction $D_{F1}$ of the cellulose blank structure 2 on the first endless belt unit 5. The width direction $D_W$ is defined as a direction perpendicular to the longitudinal direction $D_{LO}$, and the height direction $D_H$ is defined as a direction perpendicular to the longitudinal direction $D_{LO}$ and the width direction $D_H$, as understood from for example FIG. 2b.

Figure 2A:
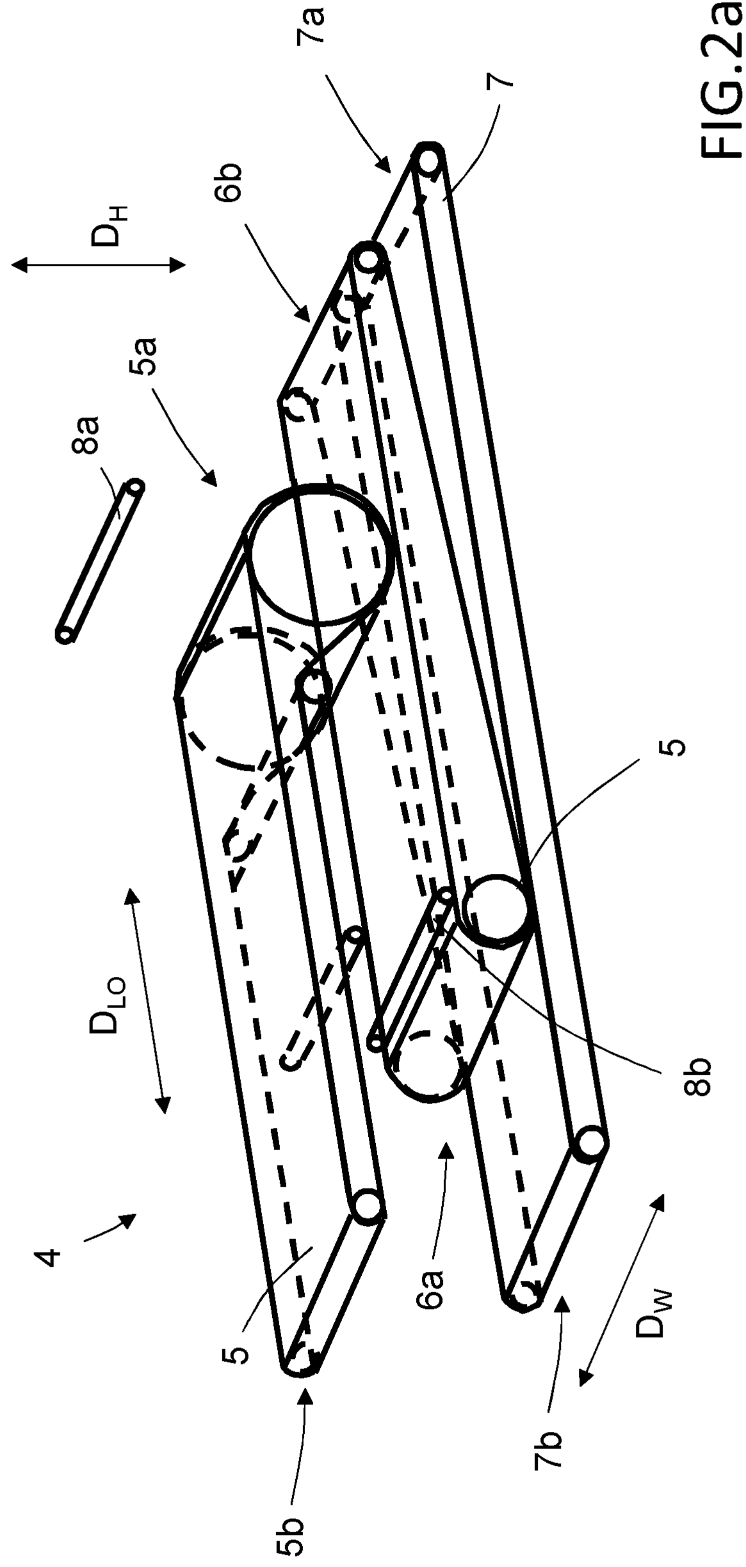
FIG. 2*a-c* show schematically, in a perspective view and in side views, the buffering module according to embodiments.

The second endless belt unit 6 is arranged in-between and in a longitudinal overlapping relationship to the first endless belt unit 5 and the third endless belt unit 7. As shown in FIG. 2a, the first endless belt unit 5, the second endless belt unit 6, and the third endless belt unit 7, are aligned in the width direction and suitably arranged with the same extension in the width direction $D_W$. The first endless belt unit 5, the second endless belt unit 6, and the third endless belt unit 7, further have a stacked configuration in the height direction $D_H$, as shown in the figures.

Figure 2B:
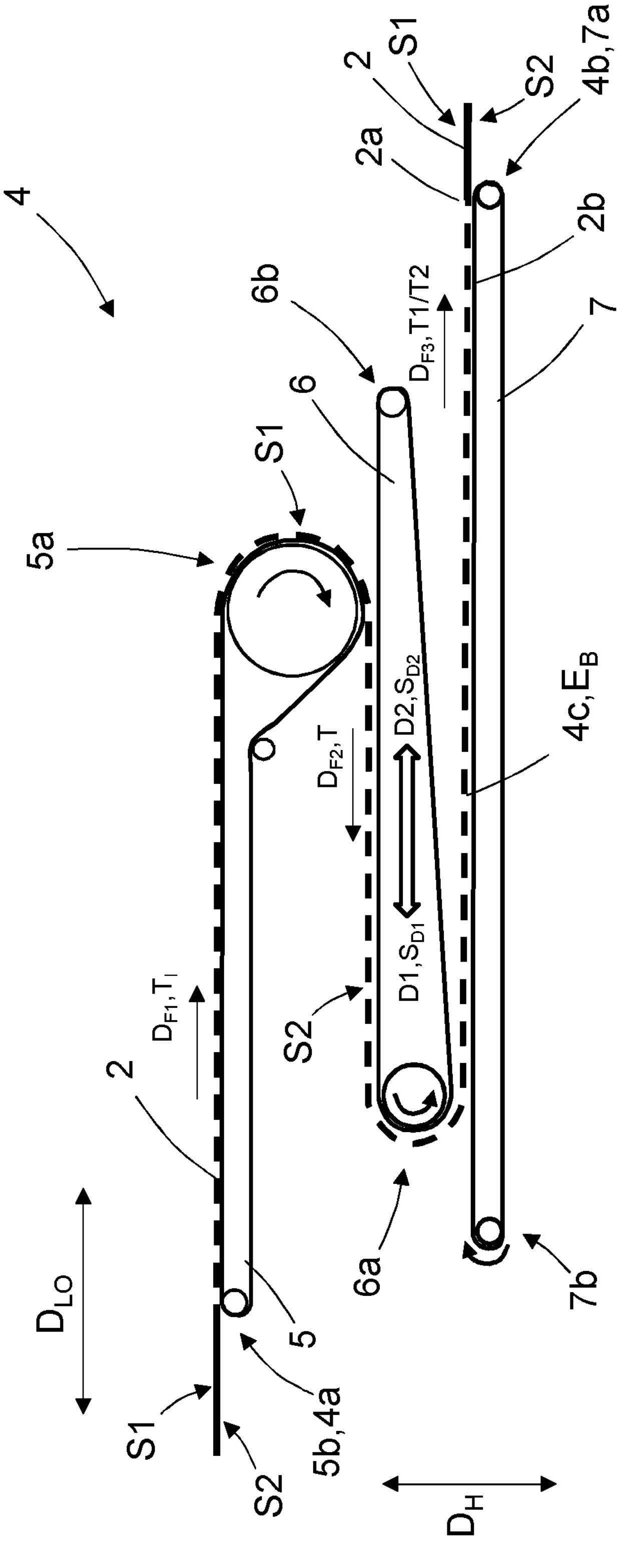

In order to establish the buffering function of the buffering module 4, the second endless belt unit 6 is movably arranged relative to the first endless belt unit 5 and the third endless belt unit 7, as indicated with the double arrow in FIG. 2b. The first endless belt unit 5 has an extension between a first upstream end 5b and a first downstream end 5a, the second endless belt unit 6 has an extension between a second upstream end 6b and a second downstream end 6a, and the third endless belt unit 7 has an extension between a third upstream end 7b and a third downstream end 7a. The cellulose blank structure 2 is entering the buffering module 4 at an inlet portion 4a, and the inlet portion 4a is corresponding to the first upstream end 5b of the first endless belt unit 5. The cellulose blank structure 2 is exiting the buffering module 4 at an outlet portion 4b, and the outlet portion 4b is corresponding to the downstream end 7a of the third endless belt unit 7.

As schematically shown in for example FIG. 2b, the cellulose blank structure 2 is continuously fed on the first endless belt unit 5 in a first feeding direction $D_{F1}$, and when the cellulose blank structure 2 reaches the first downstream end 5a it is redirected to the second endless belt unit 6. The redirection of the cellulose blank structure 2 is suitably accomplished by having the cellulose blank structure 2 following the curvature of the first endless belt unit 5 at the first downstream end 5a, as understood from FIG. 2b. When fed along the first endless belt unit 5, the second side S2 of the cellulose blank structure 2 is facing the first endless belt unit 5 and the first side S1 of the cellulose blank structure 2 is facing away from the first endless belt unit 5. When redirecting the cellulose blank structure 2 after the first endless belt unit 5, the first side S1 is facing the second endless belt unit 6. The second side S2 of the cellulose blank structure 2 is facing away from the second endless belt unit 6. The cellulose blank structure 2 is fed on the second endless belt unit 6 in a second feeding direction $D_{F2}$, where the second feeding direction $D_{F2}$ is at least partly opposite the first feeding direction $D_{F1}$. It should be understood that the first feeding direction $D_{F1}$ and the second feeding direction $D_{F2}$ may be parallel to each other in opposite directions, or alternatively arranged at an angle relative each other. Upon movement of the cellulose blank structure 2 through the buffering module 4, the second endless belt unit 6 is alternatingly longitudinally moved in opposite directions relative to the first endless belt unit 5 and the third endless belt unit 7, as indicated with the double arrow in FIG. 2*b*. When the cellulose blank structure 2 reaches the second downstream end 6*a* of the second endless belt unit 6, it is redirected to the third endless belt unit 7. The redirection of the cellulose blank structure 2 is suitably accomplished by having the cellulose blank structure 2 following the curvature of the second endless belt unit 6 at the second downstream end 6*a*, as understood from FIG. 2*b*. When fed along the second endless belt unit 6, the first side S1 of the cellulose blank structure 2 is facing the second endless belt unit 6 and the second side S2 of the cellulose blank structure 2 is facing away from the second endless belt unit 6. When redirecting the cellulose blank structure 2 after the second endless belt unit 6, the second side S2 is facing the third endless belt unit 7. The first side S1 of the cellulose blank structure 2 is facing away from the third endless belt unit 7. The cellulose blank structure 2 is intermittently fed on the third endless belt unit 7 in a third feeding direction $D_{F3}$. The third feeding direction $D_{F3}$ is at least partly coinciding with the first feeding direction $D_{F1}$. It should be understood that the first feeding direction $D_{F1}$ and the third feeding direction $D_{F3}$ may be parallel to each other, or alternatively arranged at an angle relative each other. After the third endless belt unit 7, the cellulose blank structure 2 is directly or indirectly intermittently fed to the forming mould 3.

The first feeding direction $D_{F1}$, the second feeding direction $D_{F2}$, and the third feeding direction $D_{F3}$, may be arranged parallel to each other, or alternatively at angles relative to each other, depending on the design and construction of the buffering module 4.

The buffering module 4 is configured for alternatingly operating in a buffering mode $M_B$ and a feeding mode $M_F$. The first endless belt unit 5 is operated with a continuous input transportation speed $T_I$ both in the buffering mode $M_B$ and the feeding mode $M_F$. In this way, the cellulose blank structure 2 is continuously fed to the first endless belt unit 5 and continuously transported along the first endless belt unit 5. In the buffering mode $M_B$, the third endless belt unit 7 is operated with a first transportation speed T1 upon longitudinal movement of the second endless belt unit 6 in a first direction D1. In the feeding mode, the third endless belt unit 7 is operated with a second transportation speed T2 upon longitudinal movement of the second endless belt unit 6 in a second direction D2. The second direction D2 is opposite the first direction D1. The first transportation speed T1 is lower than the second transportation speed T2 to enable intermittent feeding of the cellulose blank structure from the buffering module 4 to the forming mould 3.

In the buffering mode $M_B$, a transportation speed T of the second endless belt unit 6 is adapted to the input transportation speed $T_I$, the first transportation speed T1, as well as a first displacement speed $S_{p1}$ of the second endless belt unit 6 in the first direction D1. The transportation speed T of the second endless belt unit 6 in the buffering mode $M_B$ is lower than the input speed $T_I$ due to the movement of the of the second endless belt unit 6 in the first direction D1. The different speeds in the buffering mode $M_B$ are suitable adjusted so that the input transportation speed $T_I$ correlates to the combined transportation speed T of the second endless belt unit 6, the first displacement speed $S_{D1}$, and the first transportation speed T1. This to secure that the cellulose blank structure 2 has essentially the same tension throughout the buffering module 4. The cellulose products 1 are formed in the forming mould 3 during the buffering mode $M_B$ when the third endless belt unit 7 is operated with the first transportation speed T1 upon longitudinal movement of the second endless belt unit 6 in the first direction D1. Suitably, the first transportation speed T1 is zero, or the first transportation speed T1 is essentially zero, in order to establish a stationary cellulose blank structure 2 when forming the cellulose products in the forming mould 3.

Thus, in the buffering mode $M_B$, the cellulose blank structure 2 exiting the buffering module 4 is arranged in a non-moving or essentially non-moving state for facilitating forming of the cellulose products 1 in the forming mould. A non-moving, or essentially non-moving cellulose blank structure 2 in the forming mould 3 during the product forming operation is desired for producing cellulose products 1 with high quality.

In the feeding mode $M_F$, a transportation speed T of the second endless belt unit 6 is adapted to the input transportation speed $T_I$, the second transportation speed T2, as well as a second displacement speed $S_{D2}$ of the second endless belt unit 6 in the second direction D2. The transportation speed T of the second endless belt unit 6 in the feeding mode $M_F$ is higher than the input speed $T_I$ due to the movement of the of the second endless belt unit 6 in the second direction D2. The different speeds in the feeding mode $M_F$ are suitably adjusted so that the input transportation speed $T_I$ correlates to the combined transportation speed T of the second endless belt unit 6, the second displacement speed $S_{D2}$, and the second transportation speed T2. This to secure that the cellulose blank structure 2 has essentially the same tension throughout the buffering module 4. The cellulose blank structure 2 is fed into the forming mould 3 during the feeding mode $M_F$ when the third endless belt unit 7 is operated with the second transportation speed T2 upon longitudinal movement of the second endless belt unit 6 in the second direction D2. The feeding mode $M_F$ is enabling efficient transportation of the cellulose blank structure 2 away from the buffering module 4 to the forming mould 3.

The buffering module 4 comprises the inlet portion 4*a* and the outlet portion 4*b*, as described above. A buffering portion 4*c* of the buffering module is extending between the inlet portion 4*a* and the outlet portion 4*b*, and the buffering portion corresponds to a travelling distance for the cellulose blank structure 2 between the inlet portion 4*a* and the outlet portion 4*b*. The cellulose blank structure 2 has a buffering extension $E_B$ in the buffering portion 4*c* between the inlet portion 4*a* and the outlet portion 4*b*, as indicated with the dotted section of the cellulose blank structure in FIGS. 2*b* and 2*c*. During the buffering mode $M_B$, the buffering extension $E_B$ of the cellulose blank structure 2 in the buffering portion 4*c* is gradually increased due to the movement of the second endless belt unit 6 in the first direction D1. During the feeding mode $M_F$, the buffering extension $E_B$ of the cellulose blank structure 2 in the buffering portion 4*c* is gradually decreased due to the movement of the second endless belt unit 6 in the second direction D2.

With the configuration of the buffering module 4 and the pressing module PM illustrated in FIGS. 1*a-c*, the first direction D1 is a direction away from the forming mould 3, and the second direction D2 is a direction towards the forming mould 3.

The different operational modes of the buffering module 4 are schematically illustrated in FIGS. 3*a-c* and 4*a-c*. In the figures, only the first endless belt unit 5, the second endless belt unit 6, and the third endless belt unit 7 are shown to better illustrate the operational modes of the buffering module 4.

Figure 3A:
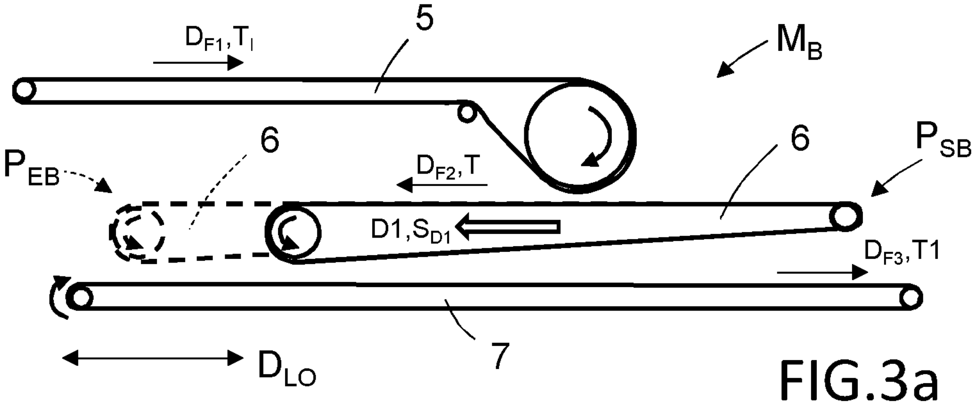
FIG. 3*a-c* show schematically, in side views, the buffering module in different operational positions during a buffering mode.
Figure 3B:
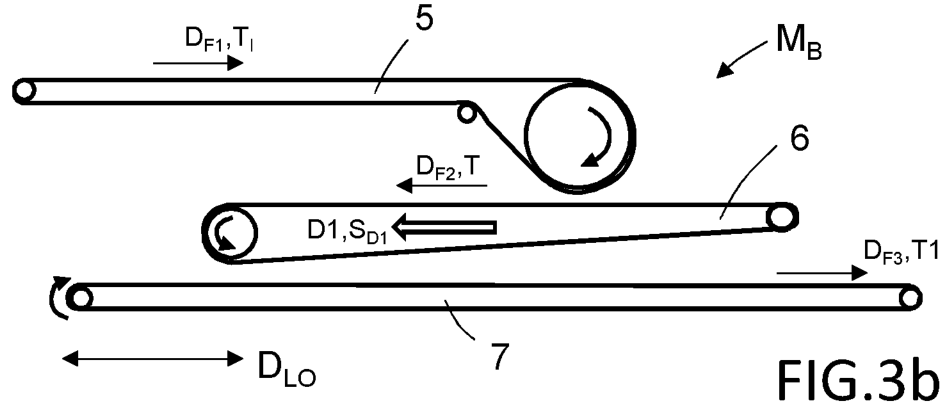
Figure 3C:
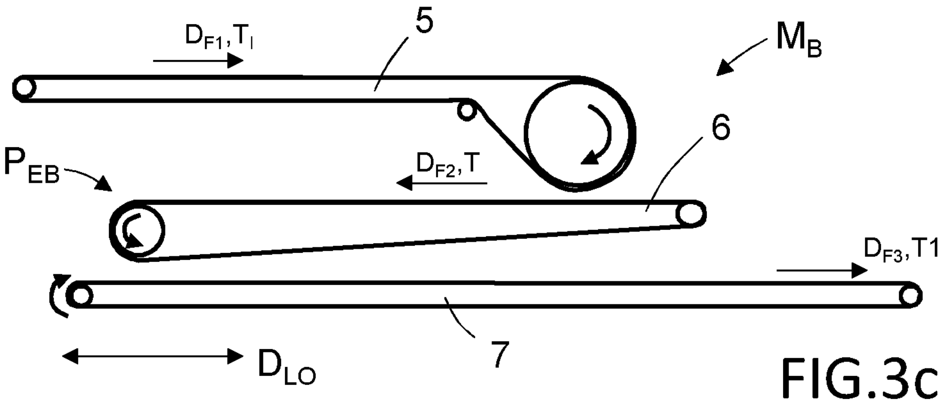

The buffering mode $M_B$ is schematically illustrated in sequences in FIGS. 3*a-c*. In FIG. 3*a*, the buffering module 4 is arranged in a position where the buffering mode $M_B$ starts. In this starting position of the buffering mode $M_B$, the second endless belt unit 6 is arranged in a buffering mode starting position $P_{SB}$, as indicated with solid lines in FIG. 3*a*. During the buffering mode $M_B$, the second endless belt unit 6 is longitudinally displaced in the first direction D1 from the buffering mode starting position $P_{SB}$ to a buffering mode ending position $P_{EB}$, and the buffering mode ending position $PE_B$ is indicated with dotted lines in FIG. 3*a* for illustrative purposes. Throughout the buffering mode $M_B$, the first endless belt unit 5 is operated with the continuous input transportation speed $T_I$, the second endless belt unit 6 is operated with the transportation speed T, and the third endless belt unit 7 is operated with the first transportation speed T1, as described above. In FIG. 3*b*, an intermediate position between the buffering mode starting position $P_{SB}$ and the buffering mode ending position $PE_B$ is schematically illustrated, and in FIG. 3*c* the buffering mode ending position $PE_B$ is schematically illustrated. When the second endless belt unit 6 reaches the buffering mode ending position $P_{EB}$, the movement of the second endless belt unit 6 is stopped and the feeding mode $M_F$ can be started.

Figure 4A:
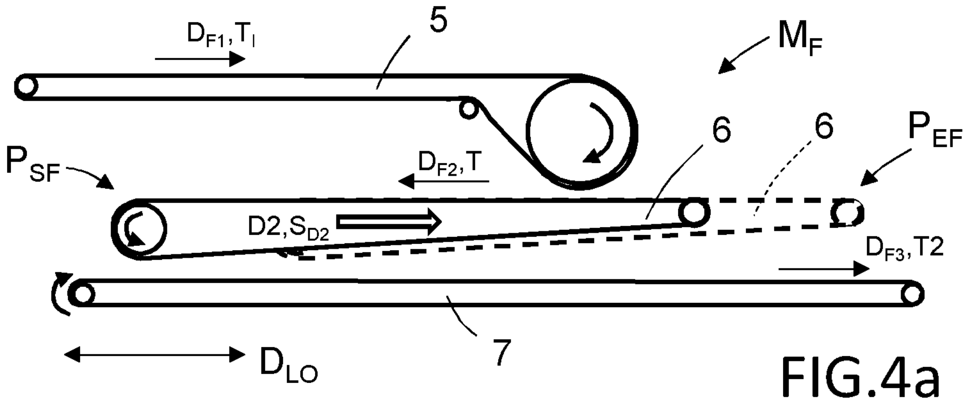
FIG. 4*a-c* show schematically, in side views, the buffering module in different operational positions during a feeding mode.

The buffering mode ending position $PE_B$ of the second endless belt unit 6 is corresponding to a feeding mode starting position $P_{SF}$, schematically shown in FIG. 4*a*.

Figure 4B:
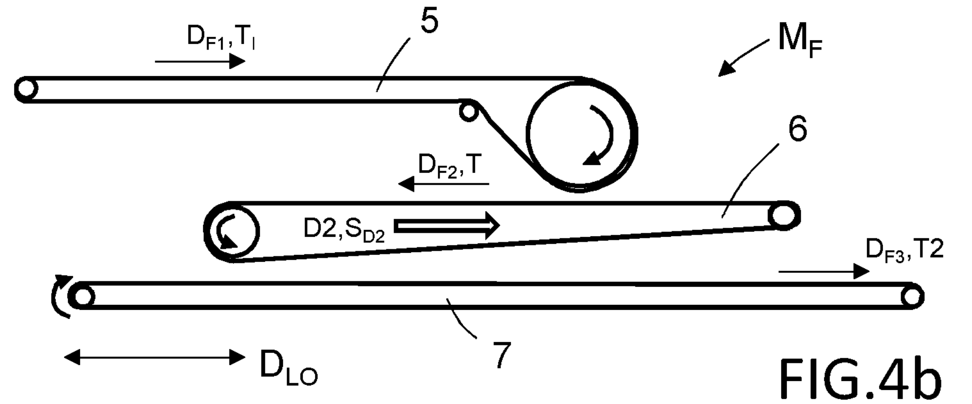
Figure 4C:
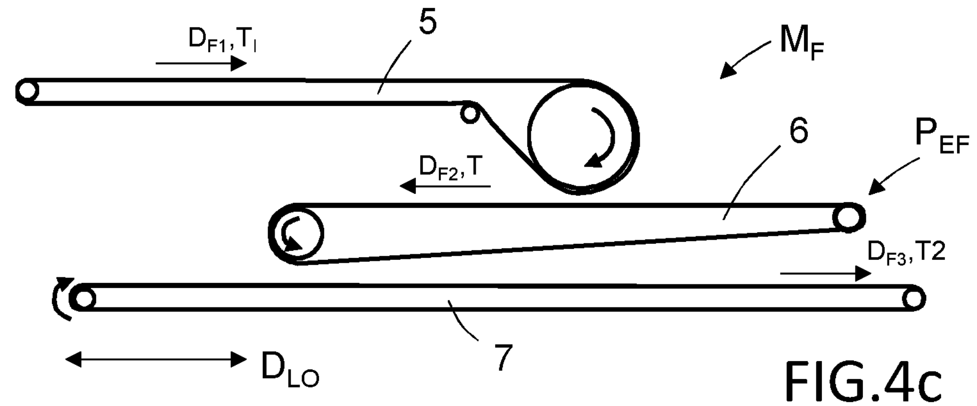

The feeding mode $M_F$ is schematically illustrated in sequences in FIGS. 4*a-c*. In FIG. 4*a*, the buffering module 4 is arranged in a position where the feeding mode $M_F$ starts. In this starting position of the feeding mode $M_F$, the second endless belt unit 6 is arranged in the feeding mode starting position $P_{SF}$, as indicated with solid lines in FIG. 4*a*. During the feeding mode $M_F$, the second endless belt unit 6 is longitudinally displaced in the second direction D2 from the feeding mode starting position $P_{SF}$ to a feeding mode ending position $P_{EF}$, and the feeding mode ending position $P_{EF}$ is indicated with dotted lines in FIG. 4*a* for illustrative purposes. Throughout the feeding mode $M_F$, the first endless belt unit 5 is operated with the continuous input transportation speed $T_I$, the second endless belt unit 6 is operated with the transportation speed T, and the third endless belt unit 7 is operated with the second transportation speed T2, as described above. In FIG. 4*b*, an intermediate position between the feeding mode starting position $P_{SF}$ and the feeding mode ending position $P_{EF}$ is schematically illustrated, and in FIG. 4*c* the feeding mode ending position $P_{EF}$ is schematically illustrated. When the second endless belt unit 6 reaches the feeding mode ending position $P_{EF}$, the movement of the second endless belt unit 6 is stopped and the buffering mode $M_B$ can be started again.

The feeding mode ending position $P_{EF}$ of the second endless belt unit 6 is corresponding to the buffering mode starting position $P_{SB}$, schematically shown in FIG. 3*a*. The buffering module 4 is alternatingly operating in the buffering mode $M_B$ and the feeding mode $M_F$ to establish the intermittent feeding of the cellulose blank structure 2 from the buffering module 4 to the forming mould 3.

Figure 2C:
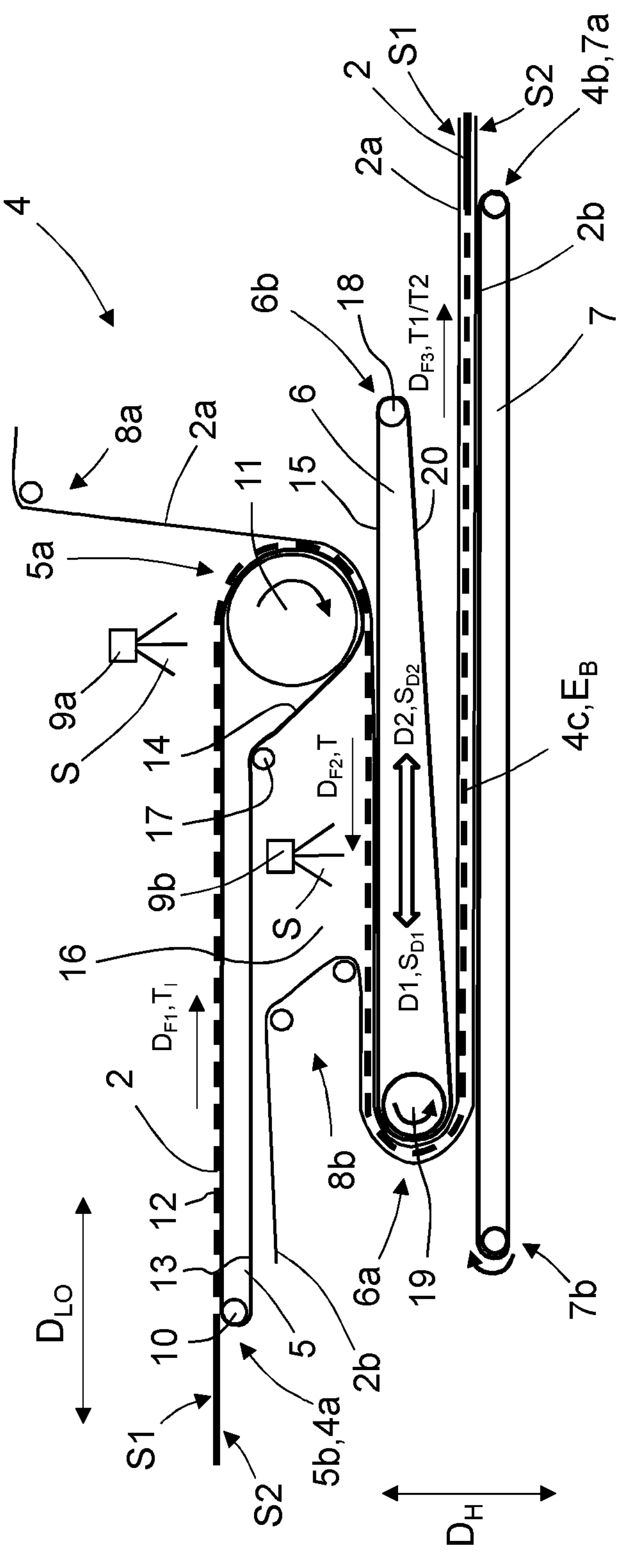

The buffering module 4 may comprise a first layer application unit 8*a* arranged in connection to the first endless belt unit 5, as shown in the embodiment illustrated in FIG. 2*c*. The first layer application unit 8*a* is configured for applying one or more first material layers 2*a* to the cellulose blank structure 2. The first layer application unit 8*a* suitably comprises feeding rollers and other transporting devices for transporting the one or more first material layers 2*a*. The first layer application unit 8*a* is suitably arranged in connection to a first downstream end 5*a* of the first endless belt unit 5. The one or more first material layers 2*a* are in this way applied to the cellulose blank structure 2 upon feeding of the cellulose blank structure 2 on the first endless belt unit 5. The one or more first material layers 2*a* are applied to the first side S1 of the cellulose blank structure 2, and the one or more first material layers 2*a* are suitably applied to the cellulose blank structure 2 in connection to a first downstream end 5*a* of the first endless belt unit 5, as shown in FIG. 2*c*. The one or more first material layers 2*a* may function as the one or more additional layers described above, and is further transported with the cellulose blank structure 2 through the buffering module 4.

The buffering module 4 may comprise a second layer application unit 8*b* arranged in connection to the second endless belt unit 6, as shown in the embodiment illustrated in FIG. 2*c*. The second layer application unit 8*b* is configured for applying one or more second material layers 2*b* to the cellulose blank structure 2. The second layer application unit 8*b* suitably comprises feeding rollers and other transporting devices for transporting the one or more second material layers 2*b*. The second layer application unit 8*b* is suitably arranged in connection to a second downstream end 6*a* of the second endless belt unit 6. The one or more second material layers 2*b* are in this way applied to the cellulose blank structure 2 upon feeding of the cellulose blank structure 2 on the second endless belt unit 6. The one or more second material layers 2*b* are applied to the second side S2 of the cellulose blank structure 2, and the one or more second material layers 2*b* are suitably applied to the cellulose blank structure 2 in connection to a second downstream end 6*a* of the second endless belt unit 6, as shown in FIG. 2*c*. The one or more second material layers 2*b* may function as the one or more additional layers described above, and is further transported with the cellulose blank structure 2 through the buffering module 4.

The buffering module 4 may further comprise a first set of spray nozzles 9*a* arranged in connection to the first endless belt unit 5, as shown in FIG. 2*c*. The first set of spray nozzles 9*a* is configured for applying one or more substances S to the cellulose blank structure 2. In this way, one or more substances S are applied to the first side S1 of the cellulose blank structure 2 upon feeding of the cellulose blank structure 2 on the first endless belt unit 5.

The buffering module 4 may further comprise a second set of spray nozzles 9*b* arranged in connection to the second endless belt unit 6, as shown in FIG. 2*c*. The second set of spray nozzles 9*b* is configured for applying one or more substances S to the cellulose blank structure 2. In this way, one or more substances S are applied to the second side S2 of the cellulose blank structure 2 upon feeding of the cellulose blank structure 2 on the second endless belt unit 6. The substances S may have any suitable composition for altering the properties of the cellulose blank structure 2 and/or the cellulose products 1, such as additives or barrier compositions. The substances may be sprayed onto the cellulose blank structure 2 in liquid form or in solid form.

Specifically, the second set of spray nozzles 9*b* is located between the first endless belt unit 5 and the second endless belt unit 6.

The one or more first material layers 2*a* may be applied to the first side S1 of the cellulose blank structure 2 after the first set of spray nozzles 9*a* have applied one or more substances S to the first side S1 of the cellulose blank structure 2.

One or more second material layers 2*b* may be applied to the second side S2 of the cellulose blank structure 2 after the second set of spray nozzles **9*b* have applied one or more substances S to the second side S2 of the cellulose blank structure 2**.

Each of the first and/or second set of spray nozzles **9*a*, 9*b*** may be implemented as single spray unit having a plurality of individual spray nozzles, or as a plurality of individual spray units, each having one or more individual spray nozzles.

The first endless belt unit 5 may be guided and conveyed in an endless path by means of belt rollers. An first upstream belt roller 10 may be located at the first upstream end **5*b* of the first endless belt unit 5, and a first downstream belt roller 11 may be located at the first downstream end 5*a* of the first endless belt unit 5**.

The endless path of the first endless belt unit 5 may largely be divided in a feed path 12 and a return path 13, wherein the portion of the first endless belt unit 5 that is arranged to carry the cellulose blank structure 2 from the first upstream end **5*b* to the first downstream end 5*a* follows the feed path 12, and wherein the portion of the first endless belt unit 5 that is arranged to return from the first downstream end 5*a* to the first upstream end 5*b* follows the return path 13**.

As illustrated in for example FIG. **2*c*, the belt rollers of the first endless belt unit 5 may be arranged such that the return path 13 of the first endless belt unit 5 approaches the feed path 12 of the first endless belt unit 5 along at least a portion 14 of the return path 13**.

Specifically, at least a portion 14 of the return path 13 may be inclined with respect to the feed path 12, such that a distance between the feed path 12 and return path 13, in the height direction, is larger at the first downstream end **5*a* of the first endless belt unit 5 than at the first upstream end 5*b* of the first endless belt unit 5**.

In other words, the feed path 12 may be arranged substantially horizontally, and a portion 14 of the return path 13 located in the region of the first downstream region **5*a* may arranged to converge towards the feed path 12, while another portion of the return path 13 located in the region of the first upstream region 5*b* may arranged to extend substantially in parallel with the feed path 12**.

For example, the first endless belt unit 5 may be guided to move upwards along a first direction after leaving the first downstream belt roller 11, and subsequently be guided to move along a second direction before arriving at the first upstream belt roller 11, wherein the first direction has a higher level of inclination.

As a result, a space 16 is provided in the area between the return path 13 of the first endless belt unit 5 and a feed path 15 of the second endless belt unit 6, although the first and second endless belt units 5, 6 have a stacked configuration in the height direction $D_H$.

The space 16 is located in a region located between the first upstream end **5*b* and the location where the return path 13 of the first endless belt unit 5 has approached the feed path 12 of the first endless belt unit 5, or in a region located between the first upstream end 5*b* and the location where the distance between the feed path 12 and return path 13, in the height direction, is smaller than at the first downstream end 5*a* of the first endless belt unit 5, or in a region located between the first upstream end 5*b* and the location where the return path 13 is converging or has converged towards the feed path 12**.

This space 16 between the return path of the first endless belt unit 5 and the feed path 15 of the second endless belt unit 6 is suitably large enough for accommodating the second set of spray nozzles **9*b*, because thereby, the second set of spray nozzles 9*b* may be arranged to provide a downwards oriented spray direction, while applying one or more substances to the second side S2 of the cellulose blank structure 2 upon feeding of the cellulose blank structure 2 on the second endless belt unit 6**.

A downwards oriented spray direction corresponds herein to an implementation where a main or centre spray direction is oriented downwards at an angle less than 45 degrees from a vertical direction, specifically downwards at an angle less than 20 degrees from a vertical direction, or more specifically downwards in a vertical direction.

A downwards oriented spray direction has many advantages compared to upwards oriented spray direction or sideways oriented spray direction. For example, a downwards oriented spray direction is easier to keep clean, has less risk of being clogged with spray substances, and the resulting spray pattern on the cellulose blank structure 2 is significantly improved.

In addition, a downwards oriented spray direction enables application of a substance while the cellulose blank structure 2 is continuously supported on a underside cellulose blank structure 2, while an upwards oriented spray direction generally requires that the cellulose blank structure 2 is conveyed without support on the underside for a certain gap, for getting access to the downwards facing surface of the cellulose blank structure 2.

A certain space 16 may for example be provided by having a relatively small diameter first upstream belt roller 10 combined with a relatively large diameter first downstream belt roller 11.

According to some example embodiments, an additional guide belt roller 17 may be provided in the return path 13 between the first upstream belt roller 10 and the first downstream belt roller 11, for providing a large space 16 between the return path 13 of the first belt unit 5 and feed path 15 of the second belt unit 6.

The additional guide belt roller 17 may be located relatively close to the feed path 12, in the height direction $D_H$. For example, the additional guide belt roller 17 may be located such that the return path 13 of the first belt unit 5, in a region after the additional guide belt roller 17, is horizontal and/or parallel with the feed path 12 of the first belt unit 5.

The second set of spray nozzles **9*b* would typically be located between the additional guide belt roller 17 and the first upstream belt roller 10**.

For example, a distance between the feed path 12 and the return path 13, as measured in the height direction $D_H$, in the area of the second set of spray nozzles **9*b*, may be less than half compared to a distance between the feed path 12 and the return path 13 at the first downstream end 5*a* of the first endless belt unit 5**.

The first set of spray nozzles **9*a*** may also be arranged to be downwards oriented spray direction. As discussed above, a downwards oriented spray direction has many advantages compared to upwards oriented spray direction or sideways oriented spray direction.

The first set of spray nozzles **9*a* may be located and arranged to spray one or more substances to the first side S1 of the cellulose blank structure 2**.

The first set of spray nozzles **9*a* may be located and arranged to spray substances to the first side S1 of the cellulose blank structure 2 while the cellulose blank structure 2 is conveyed along the feed path of the first endless belt unit 5**.

Also the second endless belt unit 6 is guided and conveyed in an endless path by means of belt rollers, wherein a second upstream belt roller 18 may be located at the second upstream end 6*b* of the second endless belt unit 6, and a second downstream belt roller 19 may be located at the second downstream end 6*a* of the second endless belt unit 6.

The second endless belt unit 6 may be guided to move upwards after leaving the second downstream belt roller 19, for example by providing the second upstream belt roller 18 with a smaller diameter than the second downstream belt roller 19, or by means of an additional guide belt roller (not showed). Thereby, the risk for interference between the return path 20 of the second endless belt unit 6 and the cellulose blank structure 2, after the cellulose blank structure 2 has shifted to the third belt unit 7, is reduced.

The first mould part 3*a* and/or the second mould part 3*b* may comprise a cutting edge configured for cutting out the formed cellulose products 1 from the cellulose blank structure 2 upon forming of the cellulose products in the forming mould 3. In this way, the formed cellulose products 1 are separated from residual parts of the cellulose blank structure 2 through a cutting action.

The forming mould 3 suitably comprises a heating unit that is establishing the forming temperature $T_F$ in the cellulose blank structure 2. The heating unit may have any suitable configuration, and as an example, a heated mould part or heated mould parts may be used for establishing the forming temperature $T_F$. The heating unit may be integrated in or cast into the first mould part 3*a* and/or the second mould part 3*b*, and suitable heating devices are e.g. electrical heaters, such as a resistor element, or fluid heaters. Other suitable heat sources may also be used.

The cellulose blank structure 2 may be arranged into the forming mould 3 in any suitable way, and as an example, the cellulose blank structure 2 may be fed from the buffering module 4 with a suitable feeding device, which is transporting the cellulose blank structure 2 to the forming mould 3 in the feeding direction $D_F$. The feeding device could for example be a conveyor belt, an industrial robot, or any other suitable manufacturing equipment.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Cellulose products
2: Cellulose blank structure
$\mathbf{2}_a$: First material layer
$\mathbf{2}_b$: Second material layer
3: Forming mould
$\mathbf{3}_a$: First mould part
$\mathbf{3}_b$: Second mould part
4: Buffering module
$\mathbf{4}_a$: Inlet portion
$\mathbf{4}_b$: Outlet portion
$\mathbf{4}_c$: Buffering portion
5: First belt unit
$\mathbf{5}_a$: First downstream end
$\mathbf{5}_b$: First upstream end
6: Second belt unit
$\mathbf{6}_a$: Second downstream end
$\mathbf{6}_b$: Second upstream end
7: Third belt unit
$\mathbf{7}_a$: Third downstream end
$\mathbf{7}_b$: Third upstream end
$\mathbf{8}_a$: First layer application unit
$\mathbf{8}_b$: Second layer application unit
$\mathbf{9}_a$: First set of spray nozzles
$\mathbf{9}_b$: Second set of spray nozzles
10: First upstream belt roller
11: First downstream belt roller
12: Feed path of first belt unit
13: Return path of first belt unit
14: Portion of the return path
15: Feed path of second belt unit
16: Space
17: Additional guide belt roller
18: Second upstream belt roller
19: Second downstream belt roller
20: Return path of second belt unit
$D_H$: Height direction
$D_{LO}$: Longitudinal direction
$D_P$: Pressing direction
$D_W$: Width direction
D1: First direction
D2: Second direction
$E_B$: Buffering extension
$F_{POS}$: Forming position
$M_B$: Buffering mode
$M_F$: Feeding mode
$O_{SP}$: Single pressing operation
$P_F$: Forming pressure
$P_{EB}$: Buffering mode ending position
$P_{EF}$: Feeding mode ending position
$P_{SB}$: Buffering mode starting position
$P_{SF}$: Feeding mode starting position
PM: Pressing module
S: Substance
$S_{D1}$: First displacement speed
$S_{D2}$: Second displacement speed
S1: First side
S2: Second side
T: Transportation speed
$T_F$: Forming temperature
$T_I$: Input transportation speed
T1: First transportation speed
T2: Second transportation speed

The invention claimed is:

1. A method for transporting an air-formed cellulose blank structure to a forming mould via a buffering module, wherein the cellulose blank structure has a first side and an opposite second side, wherein the forming mould is arranged for dry-forming cellulose products from the cellulose blank structure, wherein the buffering module comprises a first endless belt unit, a second endless belt unit, and a third endless belt unit, wherein the second endless belt unit is arranged in-between and in a longitudinal overlapping relationship to the first endless belt unit and the third endless belt unit, wherein the second endless belt unit is movably arranged relative to the first endless belt unit and the third endless belt unit, wherein the method comprises the steps: continuously feeding the cellulose blank structure on the first endless belt unit in a first feeding direction, and redirecting the cellulose blank structure to the second endless belt unit;

feeding the cellulose blank structure on the second endless belt unit in a second feeding direction being at least partly opposite the first feeding direction, wherein the second endless belt unit alternatingly is longitudinally moved in opposite directions relative to the first endless belt unit and the third endless belt unit, and redirecting the cellulose blank structure to the third endless belt unit;

intermittently feeding the cellulose blank structure on the third endless belt unit in a third feeding direction at least partly coinciding with the first feeding direction;

wherein the buffering module is configured for alternatingly operating in a buffering mode and a feeding mode, wherein the method further comprises the steps: operating the first endless belt unit with a continuous input transportation speed in the buffering mode and the feeding mode; operating the third endless belt unit with a first transportation speed upon longitudinal movement of the second endless belt unit in a first direction in the buffering mode; and operating the third endless belt unit with a second transportation speed upon longitudinal movement of the second endless belt unit in a second direction opposite the first direction in the feeding mode; and forming the cellulose products in the forming mould during the buffering mode when the third endless belt unit is operated with the first transportation speed upon longitudinal movement of the second endless belt unit in the first direction.

2. The method according to claim 1, wherein the buffering module comprises an inlet portion, an outlet portion, and a buffering portion between the inlet portion and the outlet portion, wherein the cellulose blank structure has a buffering extension in the buffering portion between the inlet portion and the outlet portion, wherein the method further comprises the steps: gradually increasing the buffering extension of the cellulose blank structure in the buffering portion during the buffering mode, and gradually decreasing the buffering extension of the cellulose blank structure in the buffering portion during the feeding mode, wherein the first direction is a direction away from the forming mould and wherein the second direction is a direction towards the forming mould, wherein the first transportation speed is lower than the second transportation speed, and wherein the first transportation speed is zero.

3. The method according to claim 1, wherein the method further comprises the steps: feeding the cellulose blank structure into the forming mould during the feeding mode when the third endless belt unit is operated with the second transportation speed upon longitudinal movement of the second endless belt unit in the second direction.

4. The method according to claim 1, wherein a first layer application unit is arranged in connection to the first endless belt unit, wherein the method further comprises the steps:

applying one or more first material layers to the cellulose blank structure upon feeding of the cellulose blank structure on the first endless belt unit;

applying the one or more first material layers to the first side of the cellulose blank structure; and applying the one or more first material layers to the cellulose blank structure in connection to a first downstream end of the first endless belt unit.

5. The method according to claim 1, wherein a second layer application unit is arranged in connection to the second endless belt unit, wherein the method further comprises the steps:

applying one or more second material layers to the cellulose blank structure upon feeding of the cellulose blank structure on the second endless belt unit;

applying the one or more second material layers to the second side of the cellulose blank structure; and applying the one or more second material layers to the cellulose blank structure in connection to a second downstream end of the second endless belt unit.

6. The method according to claim 1, wherein a first set of spray nozzles is arranged in connection to the first endless belt unit, wherein the method further comprises the steps: applying one or more substances to the first side of the cellulose blank structure upon feeding of the cellulose blank structure on the first endless belt unit.

7. The method according to claim 1, wherein a second set of spray nozzles is arranged in connection to the second endless belt unit, wherein the method further comprises the steps: applying one or more substances to the second side of the cellulose blank structure upon feeding of the cellulose blank structure on the second endless belt unit, wherein the second set of spray nozzles provides a downwards oriented spray direction when applying said one or more substances to the second side of the cellulose blank structure, and wherein the second set of spray nozzles is located between the first endless belt unit and the second endless belt unit.

8. The method according to claim 7, wherein the first endless belt unit follows a feed path when moving the first feeding direction, and wherein the first endless belt unit follows a return path when moving in the second feeding direction, wherein the first endless belt unit is guided by an additional guide belt roller in the return path of the first endless belt unit for creating an increased space between the return path of the first endless belt unit and a feed path of the second endless belt unit, and wherein the second set of spray nozzles is located in a region between the additional guide belt roller and a first upstream belt roller, as seen in a longitudinal direction of the buffering module.

9. The method according to claim 1, wherein the method further comprises the steps: forming the cellulose products from the cellulose blank structure in the forming moulds by heating the cellulose blank structure to a forming temperature in the range of 100-300° C., and pressing the cellulose blank structure with a forming pressure in the range of 1-100 MPa.

10. A buffering module for buffering an air-formed cellulose blank structure, wherein the buffering module is configured for being arranged in connection to a forming mould configured for dry-forming cellulose products from the cellulose blank structure, wherein the buffering module comprises a first endless belt unit, a second endless belt unit, and a third endless belt unit, wherein the second endless belt unit is arranged in-between and in a longitudinal overlapping relationship to the first endless belt unit and the third endless belt unit, wherein the second endless belt unit is movably arranged relative to the first endless belt unit and the third endless belt unit, wherein the buffering module is configured for continuously feeding the cellulose blank structure on the first endless belt unit in a first feeding direction, and redirecting the cellulose blank structure to the second endless belt unit;

wherein the buffering module is configured for feeding the cellulose blank structure on the second endless belt unit in a second feeding direction being at least partly opposite the first feeding direction, wherein the second endless belt unit is configured for being alternatingly longitudinally moved in opposite directions relative to the first endless belt unit and the third endless belt unit, and redirecting the cellulose blank structure to the third endless belt unit;

wherein the buffering module is configured for intermittently feeding the cellulose blank structure on the third endless belt unit in a third feeding direction at least partly coinciding with the first feeding direction;

wherein the buffering module comprises a second layer application unit arranged in connection to the second endless belt unit, wherein the second layer application unit is configured for applying one or more second material layers to the cellulose blank structure.

11. The buffering module according to claim 10, wherein the buffering module comprises a first layer application unit arranged in connection to the first endless belt unit, wherein the first layer application unit is configured for applying one or more first material layers to the cellulose blank structure, and wherein the first layer application unit is arranged in connection to a first downstream end of the first endless belt unit.

12. The buffering module according to claim 10, wherein the second layer application unit is arranged in connection to a second downstream end of the second endless belt unit.

13. The buffering module according to claim 10, wherein the buffering module comprises:

a first set of spray nozzles arranged in connection to the first endless belt unit, wherein the first set of spray nozzles is configured for applying one or more substances to the cellulose blank structure, and a second set of spray nozzles arranged in connection to the second endless belt unit, wherein the second set of spray nozzles is configured for applying one or more substances to the cellulose blank structure.

14. The buffering module according to claim 13, wherein the second set of spray nozzles is located between the first endless belt unit and the second endless belt unit.

15. The buffering module according to claim 13, wherein the second set of spray nozzles is located in a region between an additional guide belt roller and a first upstream belt roller, as seen in a longitudinal direction of the buffering module.

16. A buffering module for buffering an air-formed cellulose blank structure, wherein the buffering module is configured for being arranged in connection to a forming mould configured for dry-forming cellulose products from the cellulose blank structure, wherein the buffering module comprises a first endless belt unit, a second endless belt unit, and a third endless belt unit, wherein the second endless belt unit is arranged in-between and in a longitudinal overlapping relationship to the first endless belt unit and the third endless belt unit, wherein the second endless belt unit is movably arranged relative to the first endless belt unit and the third endless belt unit, wherein the buffering module is configured for continuously feeding the cellulose blank structure on the first endless belt unit in a first feeding direction, and redirecting the cellulose blank structure to the second endless belt unit;

wherein the buffering module is configured for feeding the cellulose blank structure on the second endless belt unit in a second feeding direction being at least partly opposite the first feeding direction, wherein the second endless belt unit is configured for being alternatingly longitudinally moved in opposite directions relative to the first endless belt unit and the third endless belt unit, and redirecting the cellulose blank structure to the third endless belt unit;

wherein the buffering module is configured for intermittently feeding the cellulose blank structure on the third endless belt unit in a third feeding direction at least partly coinciding with the first feeding direction;

wherein a set of spray nozzles is arranged to provide a downwards oriented spray direction when applying said one or more substances to the second a side of the cellulose blank structure, and wherein the set of spray nozzles is located between the first endless belt unit and the second endless belt unit.

17. A buffering module for buffering an air-formed cellulose blank structure, wherein the buffering module is configured for being arranged in connection to a forming mould configured for dry-forming cellulose products from the cellulose blank structure, wherein the buffering module comprises a first endless belt unit, a second endless belt unit, and a third endless belt unit, wherein the second endless belt unit is arranged in-between and in a longitudinal overlapping relationship to the first endless belt unit and the third endless belt unit, wherein the second endless belt unit is movably arranged relative to the first endless belt unit and the third endless belt unit, wherein the buffering module is configured for continuously feeding the cellulose blank structure on the first endless belt unit in a first feeding direction, and redirecting the cellulose blank structure to the second endless belt unit;

wherein the buffering module is configured for feeding the cellulose blank structure on the second endless belt unit in a second feeding direction being at least partly opposite the first feeding direction, wherein the second endless belt unit is configured for being alternatingly longitudinally moved in opposite directions relative to the first endless belt unit and the third endless belt unit, and redirecting the cellulose blank structure to the third endless belt unit;

wherein the buffering module is configured for intermittently feeding the cellulose blank structure on the third endless belt unit in a third feeding direction at least partly coinciding with the first feeding direction;

wherein the first endless belt unit is configured to follow a feed path when moving the first feeding direction, and wherein the first endless belt unit is configured to follow a return path when moving in the second feeding direction, wherein the buffering module comprises an additional guide belt roller in the return path of the first endless belt unit for guiding the first endless belt unit and for creating an increased space between the return path of the first endless belt unit and a feed path of the second endless belt unit.

* * * * *